July 19, 1966 D. R. BARBER 3,262,107

SIGNAL AMPLITUDE CODERS

Filed Sept. 6, 1963

Inventor
DONALD R. BARBER
By [signature]
Attorney 3,262,107

SIGNAL AMPLITUDE CODERS

Donald Robert Barber, London, England, assignor to International Standard Electric Corporation, New York, N.Y., a corporation of Delaware Filed Sept. 6, 1963, Ser. No. 307,200
Claims priority, application Great Britain, Sept. 14, 1962, 35,183/62
4 Claims. (Cl. 340—345)

This invention relates to signal amplitude coders in which a sample of a signal wave is quantized into one of $n$ levels and a code combination is generated representative of the quantized signal level.

In general coders are either "parallel" coders or "serial" coders. In a parallel coder the signal is quantized directly into one of $n$ levels and the digits of the code combination are generated in parallel. The parallel coder requires one circuit per level and can generate any code combination. In the serial coder the signal is successively compared to a reference level, in between each trial the signal has a fixed amount subtracted from it or it is divided by a fixed ratio. The digits of the code combination are generated serially, digit by digit during each trial. The serial coder requires only one circuit per digit but has the disadvantage that each circuit has to operate at a speed considerably in excess of the digit rate. The serial coder can only generate certain code combinations, for example a simple binary code.

According to the invention apparatus for quantizing and coding an amplitude sample of a signal wave comprises a plurality of quantizing means arranged in succession, a connection for applying the signal sample to the input of the first quantizing means, means for subtracting the quantizing output of each quantizing means from the input thereto and applying the difference so obtained to the input of the next succeeding quantizing means, and a plurality of coding means each individual to a quantizing means for coding the quantized output thereof.

In a preferred embodiment of the invention apparatus for quantizing and coding an amplitude sample of a signal wave, where the sample is to be quantized into one of $n$ amplitude levels, comprises first and second quantizing means each capable of quantizing a signal sample into one of $\sqrt{n}$ levels, a connection for applying the signal sample to the input of the first quantizing means, means for subtracting the quantized output thereof from the input thereto and applying the difference so obtained to the input of the second quantizing means, and coding means individual to each quantizing means for coding the quantized output thereof.

Figure 1:
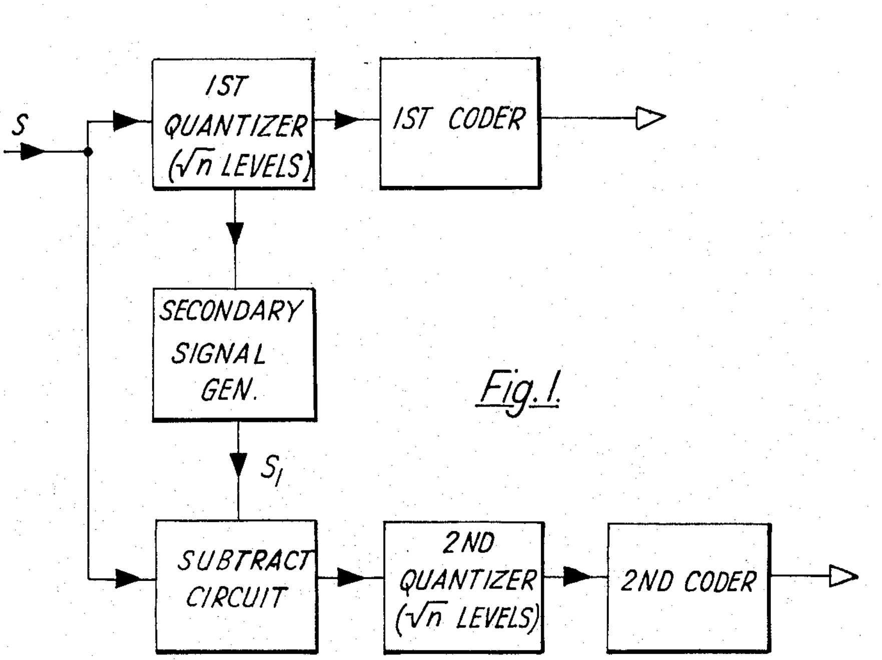
Figure 2:
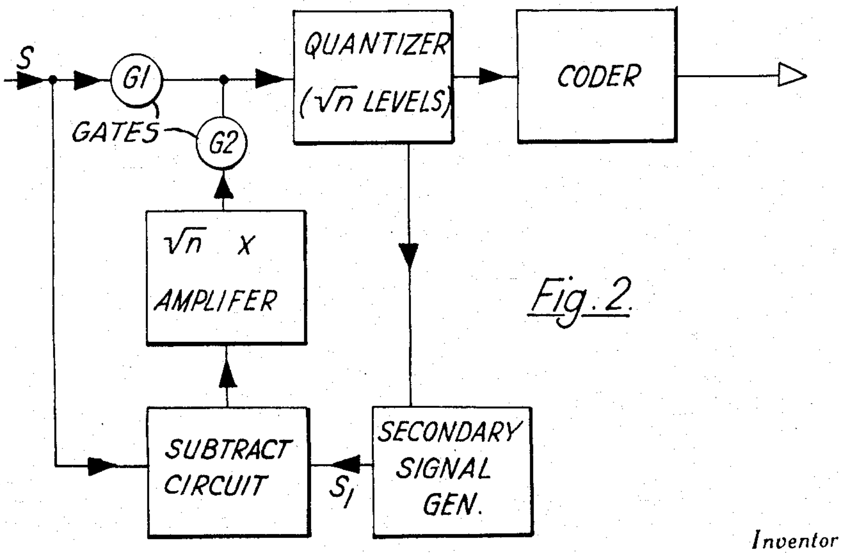

The invention will be best understood by reference to the following description of embodiments of the invention taken in conjunction with the accompanying drawings wherein FIG. 1 is a block diagram of a coder using two quantizing and coding stages; and FIG. 2 is a block diagram of a coder using a single quantizing and coding stage in a reflex circuit.

In FIG. 1 the signal S is first quantized into one of $\sqrt{n}$ levels by the first quantizer. The output of the first quantizer is coded by the first coder. The output of the first quantizer is also applied to a secondary signal generator which generates a secondary signal $S_1$ at a level equal to that level to which the incoming signal S was quantized. The secondary signal $S_1$ is then subtracted from the incoming signal S by the subtract circuit, and the difference so obtained is passed to the second quantizer, which also has $\sqrt{n}$ levels. The output from the second quantizer is coded by the second coder.

In a typical example a signal sample corresponding to level 34 has to be coded in a 100-level system. The signal is first quantized in a 10-level quantizer, and the coded output indicates that the signal level is in the 30 range. The quantized output from the first quantizer is fed to the signal generator which produces a secondary signal equal to level 30. This secondary signal is then subtracted from the original signal, providing a different signal equal to level 4 within the range 30 to 39. This difference signal is then quantized in the second 10-level quantizer, the coded output of which indicates the level 4. The two coded outputs are so arranged that the result is a code combination representing level 34.

This arrangement permits the use of two parallel coders, each having only 10 circuits for coding a signal at 100 levels. Although the number of circuits required is greater than that required by a serial coder, the speed of operation required of the circuits is approximately $\frac{1}{2}x$ (where $x$ is the number of digits) slower than in the case of the serial coder.

In the alternative arrangement shown in FIG. 2 the same quantizing and coding apparatus is used for each $\sqrt{n}$ quantizing and coding stage of the signal. At the start of the sampling period gate G1 is open and gate G2 is shut. The signal S is quantized and coded into the appropriate one of $\sqrt{n}$ levels. The gate G1 is then shut and the gate G2 is opened. The output from the quantizer is fed to the secondary signal generator and the secondary signal $S_1$ is then subtracted from the intial signal S. The difference so obtained is then passed to a $\sqrt{nx}$ amplifier before being applied to the quantizing and coding stage via the gate G2. The gate G2 is then closed and gate G1 is opened so that the circuit is ready for the next sampling period.

It will be appreciated that the invention is not limited to two quantizing and coding stages each having $\sqrt{n}$ levels. For example, it may well be that it is preferable to code a signal in two stages having different numbers of levels, i.e. a 100-level system may have two stages of 4 levels and 25 levels respectively. Similarly a large number of levels may be obtained in a system having more than two stages, i.e., 3 stages each dealing with $$\sqrt[3]{n}$$

levels or alternatively three stages each having a different number of levels.

Although the arrangement shown in FIG. 2 is restricted to $m$ stages each of $$\sqrt[m]{n}$$

levels, it is possible to feed back the quantized output in the reflex circuit as many times as may be required.

It is to be understood that the foregoing description of specific examples of this invention is not to be considered as a limitation on its scope.

What I claim is:

1. Apparatus for quantizing and coding individual amplitude samples of a signal wave comprising:

a source of said individual amplitude samples having a predetermined time interval between adjacent ones of said individual samples;

an amplitude quantizer means;

a first timed coupling means to couple the output of said source to the input of said quantizer means during a first portion of said time interval to render said quantizer means responsive to each of said samples to produce a first quantized signal at one of a given plurality of discrete amplitude levels;

a subtraction means coupled to said source and the output of said quantizer means to produce a difference signal proportional to the difference between the magnitude of said each of said samples and the magnitude of the associated one of said first quantized signal;

an amplifier means coupled to the output of said subtraction means having an amplification proportional to the number of said discrete amplitude levels capable of being produced by said quantizer means;

a second timed coupling means to couple the input of said quantizer means to the output of said amplifier means during a second portion of said time interval sequentially related to said first portion to render said quantizer means responsive to said amplified difference signal to produce a second quantized signal at one of said amplitude levels in sequence after producing said first quantized signal;

said first timed coupling means decoupling the output of said source from the input of said quantizer means during said second portion and said second timed coupling means decoupling the input of said quantizer means from the output of said amplifier means during said first portion; and coder means coupled to the output of said quantizer means to code in sequence said first quantized signal and said second quantized signal and thereby produce a coded output for said each of said amplitude samples.

2. Apparatus according to claim 1, wherein said each of said samples is to be quantized at one of $n$ amplitude levels, where $n$ equals an integer; and the amplification of said amplifier means is proportional to $\sqrt{n}$.

3. Apparatus according to claim 1, wherein said each of said samples is to be quantized at one of $n$ amplitude levels, where $n$ equals an integer; and said quantizer means is capable of quantizing said each of said samples and each of said amplified difference signal at one of $\sqrt{n}$ amplitude levels.

4. Apparatus according to claim 3, wherein the amplification of said amplifier means is proportional to $\sqrt{n}$.

References Cited by the Examiner

UNITED STATES PATENTS

| | | | |
|---|---|---|---|
| 2,605,361 | 7/1952 | Cutler | 325—38 |
| 2,617,879 | 11/1952 | Sziklai | 328—14 |
| 2,949,505 | 8/1960 | Kretzmer | 340—345 |

NEIL C. READ, *Primary Examiner.*

THOMAS B. HABECKER, *Examiner.*